United States Patent
Okamoto

(10) Patent No.: US 6,881,496 B2
(45) Date of Patent: Apr. 19, 2005

(54) ANTIFERROMAGNETICALLY COUPLED MAGNETIC RECORDING MEDIUM POSSESSING THREE COUPLED MAGNETIC LAYERS AND MAGNETIC STORAGE APPARATUS

(75) Inventor: Iwao Okamoto, Higashine (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/246,980

(22) Filed: Sep. 19, 2002

(65) Prior Publication Data

US 2003/0170499 A1 Sep. 11, 2003

(30) Foreign Application Priority Data

Mar. 6, 2002 (JP) ........................................ 2002-060942

(51) Int. Cl.$^7$ ................................................ G11B 5/66
(52) U.S. Cl. ........................ 428/611; 428/668; 428/686; 428/213; 428/336; 428/694 TM; 360/131
(58) Field of Search ................................ 428/611, 668, 428/686, 213, 336, 694 TM; 360/131

(56) References Cited

U.S. PATENT DOCUMENTS

| | | | |
|---|---|---|---|
| 6,280,813 B1 | 8/2001 | Carey et al. | |
| 2003/0022023 A1 * | 1/2003 | Carey et al. | ........ 428/694 MM |
| 2003/0087135 A1 * | 5/2003 | Wang et al. | ................ 428/695 |

FOREIGN PATENT DOCUMENTS

| | | |
|---|---|---|
| EP | 1 143 420 | 10/2001 |
| JP | 2001-56924 | 2/2001 |
| JP | 2001-260571 | 9/2001 |
| JP | 2002-063712 | 2/2002 |
| WO | WO 02/09098 | 1/2002 |
| WO | WO 02/13190 | 2/2002 |

OTHER PUBLICATIONS

Wang, J., Piramanayagam, S., Hee, C., Huang, L., Pang, S., Chow, S., Shi, X, Chong, T., J. App. Phys., 91(10), 2002, 7694–7696.*
Abarra et al.; "Longitudinal magnetic recording media with thermal stabilization layers"; Applied Physics Letters, vol. 77, No. 16, pp. 2581–2583; Oct. 16, 2000.
Abarra et al.; "Synthetic Ferrimagnetic Media"; IEEE Trans. on Magnetics, vol. 37, No. 4, part 1, pp. 1426–1431; Jul. 2001.
Inomata et al.; "Exchange Coupling Strength in Synthetic Ferrimagnetic Media"; IEEE Trans. on Magnetics, vol. 37, No. 4, Part 1, pp. 1449–1451; Jul. 2001.

* cited by examiner

Primary Examiner—Kevin M. Bernatz
(74) Attorney, Agent, or Firm—Greer, Burns & Crain, Ltd.

(57) ABSTRACT

A magnetic recording medium has first, second and third magnetic layers having magnetization directions which are alternately antiparallel in a state where no external magnetic field is applied on the magnetic recording medium, with a first nonmagnetic layer interposed between the first and second magnetic layers and a second nonmagnetic layer interposed between the second and third magnetic layers. A relationship $Ms2 \times t2 < (Ms1 \times t1 + Ms3 \times t3)$ stands, where $Ms1$, $Ms2$ and $Ms3$, and $t1$, $t2$ and $t2$ respectively denote saturation magnetizations and thicknesses of the first, second and third magnetic layers.

12 Claims, 9 Drawing Sheets

ANTIFERROMAGNETICALLY COUPLED MAGNETIC RECORDING MEDIUM POSSESSING THREE COUPLED MAGNETIC LAYERS AND MAGNETIC STORAGE APPARATUS

BACKGROUND OF THE INVENTION

This application claims the benefit of a Japanese Patent Application No.2002-060942 filed Mar. 6, 2002, in the Japanese Patent Office, the disclosure of which is hereby incorporated by reference.

1. Field of the Invention

The present invention generally relates to magnetic recording media and magnetic storage apparatuses, and more particularly to a magnetic recording medium and a magnetic storage apparatus which are suited for high-density recording.

2. Description of the Related Art

Recording densities of longitudinal magnetic recording media used in magnetic storage apparatuses such as magnetic disk units have greatly increased, due to reduction of media noise and development of magneto-resistive heads and spin-valve heads. In order to reduce the media noise of the magnetic recording medium, it is essential to further reduce the grain size of a magnetic layer which is formed by a collection of fine magnetic particles, and to reduce the magnetic coupling strength between the grains of the magnetic layer.

As the grains of the magnetic layer become magnetically isolated, the recording state is disturbed with lapse of time, thereby causing thermal instability. The thermal instability occurs when the magnetic orientation of some of the grains which should originally be oriented in the axis of easy magnetization is thermally disturbed and deviates from the axis of easy magnetization.

In order to reduce the thermal instability, it is necessary to increase the magnetization energy (anisotropic energy) along the axis of easy magnetization or, to increase the grain size so as to increase the volume energy. However, magnetic inversion becomes difficult when the anisotropic energy is increased, and an upper limit of the anisotropic energy is mainly limited by the field generated by the head. On the other hand, it is undesirable to increase the volume of the grains since this would increase the media noise.

Recently, a technique has been proposed in a Japanese Laid-Open Patent Application No.2001-56924 so as to avoid the problems of thermal instability. According to this proposed technique, the magnetic recording medium has two magnetic layers separated by a nonmagnetic layer made of Ru or the like, and the separated magnetic layers are antiferromagnetically coupled by an exchange coupling force so that the magnetic layers have antiparallel magnetizations.

FIG. 1 is a cross sectional view showing a magnetic recording medium employing this proposed technique. In FIG. 1, magnetic layers 11 and 13 are separated by an exchange coupling layer 12 which is made of Ru or the like, and magnetization directions of the magnetic layers 11 and 13 are antiparallel due to the exchange coupling force. By making the amounts of magnetization, that is, the saturation magnetization and thickness products, of the magnetic layers 11 and 13, unbalanced, a read head can detect a difference between the amounts of magnetization of the magnetic layers 13 and 11 as the recorded magnetization. Because the use of this difference between the amounts of magnetization in effect reduces the apparent thickness of the magnetic layer 13 which equivalently functions as the recording layer, it is possible to increase the linear recording density of the magnetic recording medium. In FIG. 1, a stacked structure 10 is made up of a substrate having an underlayer disposed thereon.

FIG. 1 also shows, conceptually, a magnetic particle 15. As shown in FIG. 1, the magnetizations above and below the exchange coupling layer 12 are antiferromagnetically coupled via the exchange coupling layer 12 and are antiparallel within one magnetic grain 15. As described above, when viewed from the read head, the amount of leakage magnetic field detected from the magnetic recording medium only amounts to that corresponding to an effective thickness te, due to the mutual cancellation effect between the magnetic layers 11 and 13. However, because the volume of the magnetic grain 15 is defined by V1, which corresponds to an actual thickness ta, it is possible to increase the apparent volume of the recording layer even though the magnetic recording medium in effect has a thin recording layer. For this reason, it is possible to realize a magnetic recording medium which is thermally stable.

By using the exchange coupling described above, it is possible to realize a thermally stable magnetic recording medium. Even though the conventional limit of the recording density was considered to be approximately 40 Gb/in$^2$ due to reduced superparamagnetism, it has been confirmed that the recording density of the longitudinal magnetic recording can be increased to approximately 100 Gb/in$^2$ using exchange coupling.

But in the case of the magnetic recording medium using exchange coupling, the present inventor has confirmed that the resolution may deteriorate and the nonlinear bit shift may increase from values which are predicted from the effective thickness te. A description will now be given of the problems generated in the magnetic recording medium using the exchange coupling, by referring to FIGS. 2, 3A, 3B, 4A and 4B.

FIG. 2 is a diagram showing a hysteresis loop for the magnetic recording medium shown in FIG. 1. In FIG. 2, the ordinate indicates the magnetization in arbitrary units, and the abscissa indicates the coercivity in arbitrary units. In addition, magnetization directions of the magnetic layers 11 and 13 are shown alongside the loop in FIG. 2. This loop is obtained using a measuring apparatus which requires several tens of minutes for the magnetic field to change, such as a vibrating sample type magnetometer. As may be seen from FIG. 2, the magnetization directions of the antiferromagnetically coupled magnetic layers 11 and 13 are antiparallel in a state ST1 or a state ST2, where these states ST1 and ST2 are residual magnetization states.

FIGS. 3A and 3B and FIGS. 4A and 4B are diagrams for generally explaining situations where bits are recorded on the magnetic recording medium shown in FIG. 1. In the case of the magnetic recording medium having the hysteresis loop shown in FIG. 2, the use of a material having magnetic anisotropy for the magnetic layer 11 increases the KuV/kT value which is a parameter of the thermal stability of the magnetic recording medium as a whole, and it is possible to obtain a high thermal stability, where Ku denotes a magnetic anisotropy constant, V denotes an average magnetic grain volume, k denotes a Boltzmann constant, and T denotes the temperature. The KuV/kT value is sometimes also referred to as the thermal stability factor.

Generally, it is known that a coercivity Hc of the magnetic recording medium is increased by a high-speed A.C. magnetic field. Such an increasing coercivity Hc is called a dynamic coercivity Hc' or, simply dynamic Hc. The dynamic coercivity Hc' determines an in-plane overwrite characteristic of the magnetic recording medium. It may easily be inferred that such a phenomenon also occurs physically in the magnetic layer 11.

FIGS. 3A and 3B and FIGS. 4A and 4B show the magnetization states which occur by the writing of a write head. FIG. 3A shows a case where the dynamic coercivity Hc' of the magnetic layer 11 does not become large in a time region of a write process of the write head, where a magnetization inversion process α of the magnetic layer 11 is located in a negative magnetic field region. On the other hand, FIG. 4A shows a case where the dynamic coercivity Hc' of the magnetic layer 11 becomes large in the time region of the write process of the write head. In other words, in the case shown in FIG. 4A, even when the hysteresis loop shown in FIG. 2 is obtained by changing the magnetic field by taking a sufficiently long time, the magnetization inversion process of the magnetic layer 11 may enter a positive magnetic field region as indicated by β if the dynamic coercivity Hc' of the magnetic layer 11 increases in the time region of the write process of the write head. In FIGS. 3A and 4A, the ordinate indicates the magnetization in arbitrary units, and the abscissa indicates the magnetic field in arbitrary units.

FIG. 3B shows the formation of a magnetization transition region for the case shown in FIG. 3A, that is, for the case where the time dependency of the dynamic coercivity Hc' of the magnetic layer 11 is not large and a magnetization inversion process L1 remains in the negative magnetic field region even for a high-speed change of the magnetic field. In FIG. 3B, it is assumed that a trailing edge 19 of the write head moves from the left to right. In the state shown in FIG. 3B, a region on the right side of the trailing edge 19 of the write head corresponds to a position below a write gap. When the magnetic field of the head is instantaneously inverted in the state shown in FIG. 3B, a transition region is written in the magnetic layer 13. In FIG. 3B, a dotted line conceptually shows the magnetic field from the head, and arrows indicate the direction of the magnetic field after the magnetic field of the head is inverted. In the magnetic layer 13, the region on the right side of the transition region corresponds to a magnetic field region B of the loop shown in FIG. 3A, and the recorded magnetization direction is to the right. On the other hand, in the magnetic layer 11, the magnetic field generated by the head in the region on the left side of the gap corresponds to a magnetic field region A of the loop shown in FIG. 3A, and the recorded magnetization direction of the magnetic layer 11 in the region on the right side of the gap is to the right as shown in FIG. 3B. Hence, as may be seen from FIG. 3B, the transition region is only formed in the magnetic layer 13 in the vicinity of the trailing edge 19 in the case of this magnetic recording medium.

On the other hand, when the time dependency of the dynamic coercivity Hc' of the magnetic layer 11 is large, the hysteresis loop of the magnetic recording medium becomes as indicated by a solid line in FIG. 4A for the high-speed change of the magnetic field. FIG. 4B shows the formation of a magnetization transition region for such a magnetic recording medium. It is assumed for the sake of convenience that the write head used is the same as the write head used in FIG. 3B. In FIG. 4B, it is assumed that the trailing edge 19 of the write head moves from the left to right. In the state shown in FIG. 4B, a region on the right side of the trailing edge 19 of the write head corresponds to a position below the write gap. When the magnetic field of the head is instantaneously inverted in the state shown in FIG. 4B, a transition region ① is written in the magnetic layer 13. In FIG. 4B, a dotted line conceptually shows the magnetic field from the head, and arrows indicate the direction of the magnetic field after the magnetic field of the head is inverted. In the magnetic layer 13, the region on the right side of the transition region ① corresponds to a magnetic field region C of the loop shown in FIG. 4A, and the recorded magnetization direction is to the right. On the other hand, in the magnetic layer 11, the region on the left side of the transition region ① corresponds to the magnetic field range of the head from the region B to the region A, and the recorded magnetization direction of the magnetic layer 11 remains to the left. In the magnetic recording medium having the hysteresis loop shown in FIG. 4A, the dynamic coercivity Hc' of the magnetic layer 11 is time dependent, and the dynamic coercivity Hc' of the magnetic layer 11 increases in the high-speed write region of the magnetic storage apparatus. Thus, the magnetization inversion of the magnetic layer 11 that is observed when the vibrating sample type magnetometer or the like is used to make the measurement by taking a long time, changes from a position α' to a position β during the high-speed write in FIG. 4A. For this reason, the magnetization of the magnetic layer 11 becomes complex compared to the magnetic recording medium having the hysteresis loop shown in FIG. 3A.

In other words, the magnetic field of the head indicated by the dotted line in FIG. 4B decreases towards a position on the left side of and further away from the trailing edge 19. When the magnetic field takes a value at the position indicated by β in FIG. 4A, a magnetization transition region ② is formed in the magnetic layer 11. As the position on the left side of the trailing edge 19 moves further away from the trailing edge 19, the magnetic field of the head decreases. In addition, since the region on the left side of the trailing edge 19 experiences a magnetic field in a direction opposite to that of the magnetic field indicated by the dotted line, a magnetization transition region ③ having a stretch to a certain extent is formed by the inversion of the magnetic layer 11 indicated by a α" in FIG. 4A.

In the magnetic layer 11, the magnetic field of the head acts in a region B shown in FIG. 4A, in a range from immediately below the magnetization transition region ① to the magnetization transition region ②. In addition, in the magnetic layer 11, the magnetic field of the head acts in a region A shown in FIG. 4A, in a range from the magnetization transition region ② to the magnetization transition region ③. The positional relationship of the magnetization transition regions ①, ② and ③ varies depending on the magnetic characteristic of the magnetic recording medium, the data transfer rate of the magnetic storage apparatus such as the magnetic disk drive, and the magnetic field intensity generated by the head. But when the recording is carried out at approximately 40 Gb/in$^2$, an interval between the magnetization transition regions ① and ② is approximately 20 nm which is narrow compared to a minimum bit interval of approximately 40 nm for the 40 Gb/in$^2$ recording. On the other hand, an interval between the magnetization transition regions ① and ③ is approximately 300 nm, and an interval between the magnetization transition regions ② and ③ is considerably large compared to the minimum bit interval of 40 nm for the 40 Gb/in$^2$ recording.

As is evident from the discussion above, no magnetization transition region is formed in the magnetic layer 11 in the vicinity of the trailing edge 19 as shown in FIG. 3B in the case of the magnetic recording medium having the hysteresis loop shown in FIG. 3A. But in the case of the magnetic recording medium having the hysteresis loop shown in FIG. 4A, the magnetization transition region is formed in the magnetic layer 11 in the vicinity of the trailing edge 19 as shown in FIG. 4B.

When recording the second bit on the magnetic recording medium, the write magnetic field of the head increases due to the magnetic field generated by the previously recorded first bit. As a result, a phenomenon occurs where the second bit is recorded at a position closer to the previously recorded first bit than an original position where the second bit should actually be recorded. This phenomenon is called non-linear transition shift (NLTS). The resolution deteriorates and the high-density recording capability deteriorates when the NLTS is large. Compared to the magnetic recording medium shown in FIGS. 3A and 3B, the magnetization transition region is additionally formed in the case of the magnetic recording medium shown in FIGS. 4A and 4B, thereby deteriorating the NLTS of the magnetic recording medium shown in FIGS. 4A and 4B. Because the magnetization transition region ③ is far away from the magnetization transition region ②, the NLTS is virtually unaffected by the magnetization transition region ③.

The present inventor compared the magnetic recording medium of the type shown in FIG. 3A and the magnetic recording medium of the type shown in FIG. 4A, and confirmed that the resolution deteriorates by approximately 3% to 5% and the NLTS deteriorates by approximately 30% for the magnetic recording medium of the type shown in FIG. 4A. However, the present inventor also confirmed that, when a material having a large magnetic anisotropy is used for the magnetic layer 11 in the magnetic recording medium of the type shown in FIG. 4A, the thermal stability is better compared to that of the magnetic recording medium of the type shown in FIG. 3A.

Therefore, in the magnetic recording medium using the exchange coupling described above in conjunction with FIG. 1, there was a problem in that the thermal stability may improve depending on the behavior of the dynamic coercivity Hc' of the magnetic layer 11, but the resolution and the NLTS may also deteriorate.

SUMMARY OF THE INVENTION

Accordingly, it is a general object of the present invention to provide a novel and useful magnetic recording medium and magnetic storage apparatus, in which the problem described above is eliminated.

Another and more specific object of the present invention is to provide a magnetic recording medium using exchange coupling but capable of improving the thermal stability without deteriorating the resolution and the NLTS, and to a magnetic storage apparatus which uses such a magnetic recording medium.

In keeping with one aspect of the invention, a magnetic recording medium has a first magnetic layer having a saturation magnetization $Ms1$ and a thickness $t1$; a first nonmagnetic layer provided on the first magnetic layer; a second magnetic layer, provided on the first nonmagnetic layer, having a saturation magnetization $Ms2$ and a thickness $t2$; a second nonmagnetic layer provided on the second magnetic layer; and a third magnetic layer, provided on the second nonmagnetic layer, having a saturation magnetization $Ms3$ and a thickness $t3$, where the first, second and third magnetic layers have magnetization directions which are alternately antiparallel in a state where no external magnetic field is applied on the magnetic recording medium, and wherein a relationship $Ms2 \times t2 < (Ms1 \times t1 + Ms3 \times t3)$ stands. According to this embodiment of the present invention, it is possible to improve thermal stability without deteriorating resolution and the NLTS. In addition, since the media noise is effectively reduced compared to the conventional magnetic recording media, the magnetic recording medium of the present invention is suited for use in a high-density magnetic recording exceeding 100 Gb/in².

Another aspect of the present invention is to provide a magnetic recording medium having a first magnetic layer having a saturation magnetization $Ms1$ and a thickness $t1$; a first nonmagnetic layer provided on the first magnetic layer; a second magnetic layer, provided on the first nonmagnetic layer, having a saturation magnetization $Ms2$ and a thickness $t2$; a second nonmagnetic layer provided on the second magnetic layer; and a third magnetic layer, provided on the second nonmagnetic layer, having a saturation magnetization $Ms3$ and a thickness $t3$, where the first, second and third magnetic layers have magnetization directions which are alternately antiparallel in a state where no external magnetic field is applied on the magnetic recording medium, and wherein a relationship $|Ms1 \times t1 - Ms3 \times t3|/(Ms1 \times t1 + Ms3 \times t3)/2 < 0.3$ stands. According to this embodiment of the present invention, it is possible to improve thermal stability without deteriorating resolution and the NLTS. In addition, since media noise is effectively reduced compared to the conventional magnetic recording media, the magnetic recording medium of the present invention is suited for use in a high-density magnetic recording exceeding 100 Gb/in².

Another aspect of the present invention is to provide a magnetic recording medium comprising a first magnetic layer having a coercivity $Hc1$; a first nonmagnetic layer provided on the first magnetic layer; a second magnetic layer, provided on the first nonmagnetic layer, having a coercivity $Hc2$; a second nonmagnetic layer provided on the second magnetic layer; and a third magnetic layer, provided on the second nonmagnetic layer, having a coercivity $Hc3$, where the first, second and third magnetic layers have magnetization directions which are alternately antiparallel in a state where no external magnetic field is applied on the magnetic recording medium, and wherein relationships $Hc2 < Hc1$ and $Hc2 < Hc3$ stand. According to this embodiment of the present invention, it is possible to improve thermal stability without deteriorating resolution and the NLTS. In addition, since media noise is effectively reduced compared to the conventional magnetic recording media, the magnetic recording medium of the present invention is suited for use in a high-density magnetic recording exceeding 100 Gb/in².

Still another aspect of the present invention is to provide a magnetic recording medium including a first magnetic layer having a coercivity $Hc1$; a first nonmagnetic layer provided on the first magnetic layer; a second magnetic layer, provided on the first nonmagnetic layer, having a coercivity $Hc2$; a second nonmagnetic layer provided on the second magnetic layer; and a third magnetic layer, provided on the second nonmagnetic layer, having a coercivity $Hc3$, where the first, second and third magnetic layers have magnetization directions which are alternately antiparallel in a state where no external magnetic field is applied on the magnetic recording medium, and wherein relationships $|Hc1-Hc3|/(Hc1+Hc3)/2 < 0.3$ stands. According to this aspect of the present invention, it is possible to improve the thermal stability without deteriorating the resolution and the NLTS. In addition, since the media noise is effectively reduced compared to the conventional magnetic recording media, the magnetic recording medium of the present invention is suited for use in a high-density magnetic recording exceeding 100 Gb/in².

Still another aspect of the present invention is to provide a magnetic storage apparatus with one or a plurality of magnetic recording media; and recording and/or reproducing means for recording information to and/or reproducing information from the one or plurality of magnetic recording media, where each magnetic recording medium has a first magnetic layer having a saturation magnetization Ms1 and a thickness t1; a first nonmagnetic layer provided on the first magnetic layer; a second magnetic layer, provided on the first nonmagnetic layer, having a saturation magnetization Ms2 and a thickness t2; a second nonmagnetic layer provided on the second magnetic layer; and a third magnetic layer, provided on the second nonmagnetic layer, having a saturation magnetization Ms3 and a thickness t3, the first, second and third magnetic layers have magnetization directions which are alternately antiparallel in a state where no external magnetic field is applied on the magnetic recording medium, and wherein a relationship Ms2×t2<(Ms1×t1+Ms3×t3) stands. According to this aspect of the present invention, it is possible to improve thermal stability without deteriorating resolution and the NLTS. In addition, since media noise is effectively reduced compared to the conventional magnetic recording media, the magnetic storage apparatus of the present invention is suited for carrying out a high-density magnetic recording exceeding 100 Gb/in$^2$.

Another aspect of the present invention is to provide a magnetic storage apparatus including one or a plurality of magnetic recording media; and recording and/or reproducing means for recording information to and/or reproducing information from the one or plurality of magnetic recording media, where each magnetic recording medium has a first magnetic layer having a saturation magnetization Ms1 and a thickness t1; a first nonmagnetic layer provided on the first magnetic layer; a second magnetic layer, provided on the first nonmagnetic layer, having a saturation magnetization Ms2 and a thickness t2; a second nonmagnetic layer provided on the second magnetic layer; and a third magnetic layer, provided on the second nonmagnetic layer, having a saturation magnetization Ms3 and a thickness t3, the first, second and third magnetic layers have magnetization directions which are alternately antiparallel in a state where no external magnetic field is applied on the magnetic recording medium, and wherein a relationship |Ms1×t1−Ms3×t3|/(Ms1×t1+Ms3×t3)/2<0.3 stands. According to this embodiment of the present invention, it is possible to improve thermal stability without deteriorating resolution and the NLTS. In addition, since media noise is effectively reduced compared to the conventional magnetic recording media, the magnetic storage apparatus of the present invention is suited for carrying out a high-density magnetic recording exceeding 100 Gb/in$^2$.

Still another aspect of the present invention is to provide a magnetic storage apparatus with one or a plurality of magnetic recording media; and recording and/or reproducing means for recording information to and/or reproducing information from the one or plurality of magnetic recording media, where each magnetic recording medium has a first magnetic layer having a coercivity Hc1; a first nonmagnetic layer provided on the first magnetic layer; a second magnetic layer, provided on the first nonmagnetic layer, having a coercivity Hc2; a second nonmagnetic layer provided on the second magnetic layer; and a third magnetic layer, provided on the second nonmagnetic layer, having a coercivity Hc3, where the first, second and third magnetic layers have magnetization directions which are alternately antiparallel in a state where no external magnetic field is applied on the magnetic recording medium, and wherein relationships Hc2<Hc1 and Hc2<Hc3 stand. According to this embodiment of the present invention, it is possible to improve the thermal stability without deteriorating the resolution and the NLTS. In addition, since the media noise is effectively reduced compared to the conventional magnetic recording media, the magnetic storage apparatus of the present invention is suited for carrying out a high-density magnetic recording exceeding 100 Gb/in$^2$.

A further aspect of the present invention is to provide a magnetic storage apparatus including one or a plurality of magnetic recording media; and recording and/or reproducing means for recording information to and/or reproducing information from the one or plurality of magnetic recording media, where each magnetic recording medium comprises a first magnetic layer having a coercivity Hc1; a first nonmagnetic layer provided on the first magnetic layer; a second magnetic layer, provided on the first nonmagnetic layer, having a coercivity Hc2; a second nonmagnetic layer provided on the second magnetic layer; and a third magnetic layer, provided on the second nonmagnetic layer, having a coercivity Hc3, where the first, second and third magnetic layers have magnetization directions which are alternately antiparallel in a state where no external magnetic field is applied on the magnetic recording medium, and wherein relationships |Hc1−Hc3|/(Hc1+Hc3)/2<0.3 stands. According to this embodiment of the present invention, it is possible to improve the thermal stability without deteriorating the resolution and the NLTS. In addition, since the media noise is effectively reduced compared to the conventional magnetic recording media, the magnetic storage apparatus of the present invention is suited for carrying out a high-density magnetic recording exceeding 100 Gb/in$^2$.

Other objects and further features of the present invention will be apparent from the following detailed description when read in conjunction with the accompanying drawings.

DESCRIPTION OF THE PREFERRED EMBODIMENTS

A description will be given of embodiments of a magnetic recording medium according to the present invention and a magnetic storage apparatus according to the present invention, by referring to FIG. 5 and the subsequent drawings.

Figure 5:
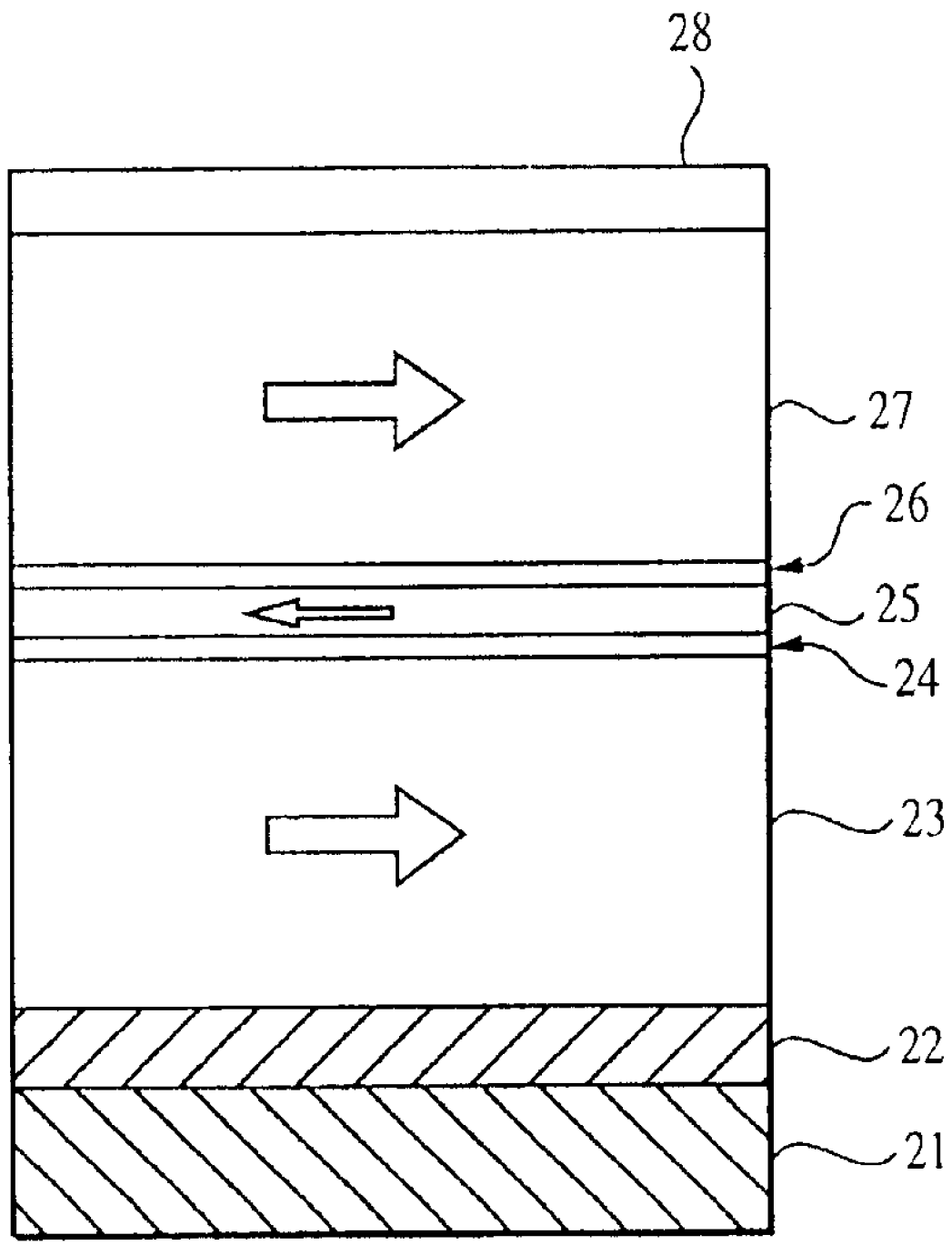
FIG. 5 is a cross sectional view showing part of a first embodiment of a magnetic recording medium according to the present invention.

As shown in FIG. 5, the magnetic recording medium has a substrate 21 which is made of a material typically used for hard disk media, such as glass and Al. An underlayer 22 which is made of a material having a hcp structure such as Cr is formed on the substrate 21, so as to promote in-plane orientation of c-axes of magnetic layers, which will be described later. A first magnetic layer 23, a second magnetic layer 25, and a third magnetic layer 27 are provided above the underlayer 22. For example, the underlayer 22 may be formed by a multi-layer structure which is made up of an amorphous seed layer, and an underlayer which is formed on the seed layer and is made of a CrMo alloy or the like having a BCC structure and a (002) crystal face oriented parallel to a surface of the substrate 21 (hereinafter referred to as a substrate surface). The first, second and third magnetic layers 23, 25 and 27 are made of a material selected from a group including Co, Ni, Fe, Ni alloys, Fe alloys, and Co alloys, and the Co alloys may include CoCrTa, CoCrPt and CoCrPt-M, where M=B, Mo, Nb, Ta, W, Cu, C or alloys thereof. Axes of easy magnetization of the first and third magnetic layers 23 and 27 are in-plane, which is parallel to the substrate surface.

A first nonmagnetic layer 24 is interposed between the first and second magnetic layers 23 and 25 to antiferromagnetically couple the first and second magnetic layers 23 and 25 so that the magnetization directions of the first and second magnetic layers 23 and 25 become antiparallel. In addition, a second nonmagnetic layer 26 is interposed between the second and third magnetic layers 25 and 27 to antiferromagnetically couple the second and third magnetic layers 25 and 27 so that the magnetization directions of the second and third magnetic layers 25 and 27 become antiparallel. The first and second nonmagnetic layers 24 and 26 are made of a material selected from a group including Ru, Rh, Ir, Ru alloys, Rh alloys and Ir alloys. Each of the first and second nonmagnetic layers 24 and 26 has a thickness of approximately 0.4 nm to 2.0 nm. Normally, it is desirable that the first and second nonmagnetic layers 24 and 26 are made of Ru. When the thickness of each of the first and second nonmagnetic layers 24 and 26 made of Ru is set to approximately 0.8 nm, it is possible to obtain a hysteresis loop shown in FIG. 6.

A protection layer 28 is formed on the third magnetic layer 27. For example, the protection layer 28 may have a multi-layer structure which is made up of a C layer and a lubricant layer formed on the C layer.

In the following description, thicknesses of the first, second and third magnetic layers 23, 25 and 27 are respectively denoted by t1, t2 and t3. In addition, saturation magnetizations of the first, second and third magnetic layers 23, 25 and 27 are respectively denoted by Ms1, Ms2 and Ms3, and coercivities of the first, second and third magnetic layers 23, 25 and 27 are respectively denoted by Hc1, Hc2 and Hc3. In order to make this embodiment of the magnetic recording medium function effectively, it is preferable that the following condition is satisfied among the first, second and third magnetic layers 23, 25 and 27.

$$Ms1 \times t1 + Ms3 \times t3 > Ms2 \times t2$$

Figure 6:
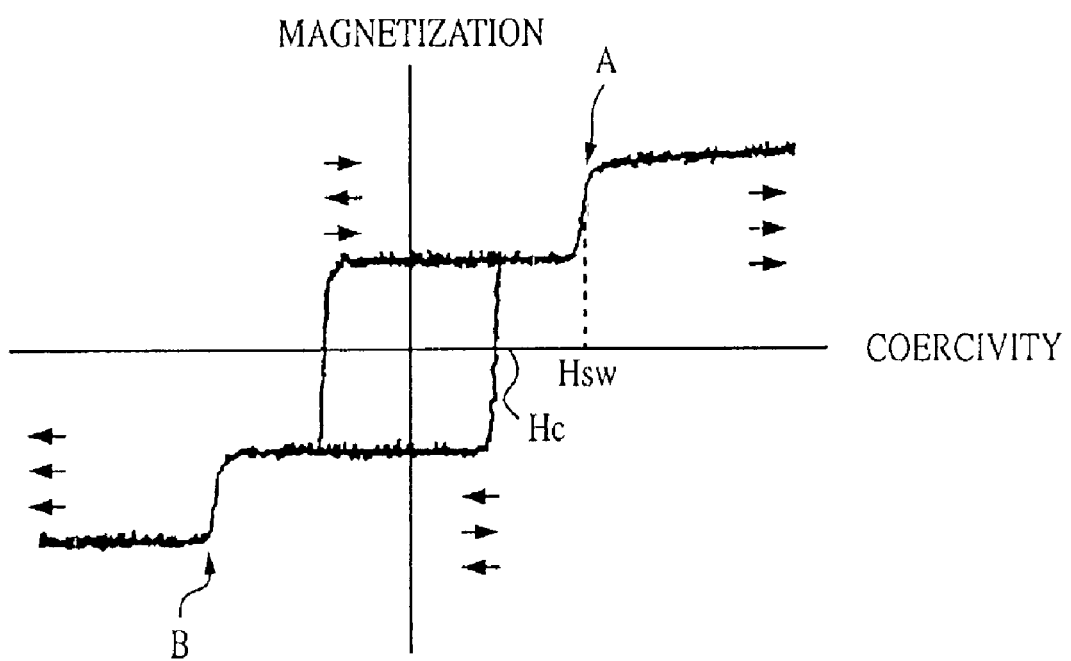
FIG. 6 is a diagram showing a hysteresis loop of the first embodiment of the magnetic recording medium.

It is not essential for the values Ms1×t1 and Ms3×t3 to be the same. However, if the values Ms1×t1 and Ms3×t3 are set to close values, the coercivities Hc1 and Hc3 also become close values, and the slope becomes sharp in a vicinity of Hc in the hysteresis loop shown in FIG. 6, thereby making the magnetic recording medium suited for the high-density recording. FIG. 6 is a diagram showing the hysteresis loop of this embodiment of the magnetic recording medium. In FIG. 6, the ordinate indicates the magnetization in arbitrary units, and the abscissa indicates the coercivity in arbitrary units.

Figure 7:
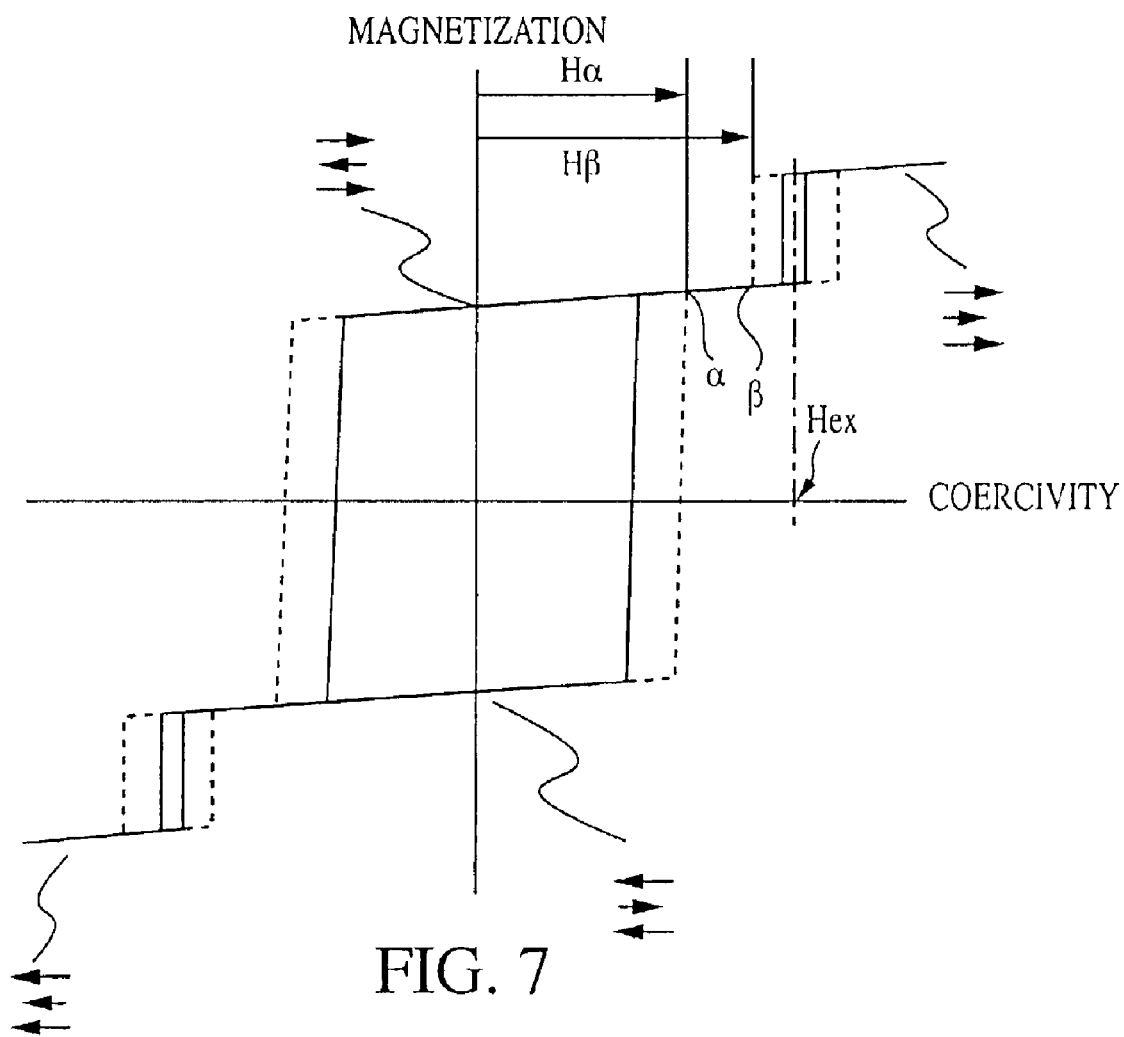
FIG. 7 is a diagram showing a hysteresis loop for a case where a material having a sufficiently large coercivity is used for a second magnetic layer.

Although not visible in FIG. 6, an eye may be generated in the loop in the vicinities of A and B when a material having a sufficiently large coercivity Hc2 is used for the second magnetic layer 25. FIG. 7 is a diagram conceptually showing this state where the eye is generated. The eyes in the loop shown in FIG. 7 do not greatly change the various magnetic recording characteristics, such as the signal-to-noise ratio (SNR) and the NLTS, of this embodiment of the magnetic recording medium, if the magnetic recording is carried out using the magnetic recording medium under the preconditions described hereunder. In FIG. 7, the ordinate indicates the magnetization in arbitrary units, and the abscissa indicates the coercivity in arbitrary units.

Next, a description will be given of the basic method of using this embodiment of the magnetic recording medium, by referring to FIG. 7. The hysteresis loop indicated by a solid line in FIG. 7 is obtained by a vibrating sample type magnetometer or the like when the magnetic field is changed over a long time. On the other hand, a hysteresis loop indicated by a dotted line in FIG. 7 is observed when a high-speed write is carried out by the write head. The magnetic recording medium is used in a manner such that a maximum value of the magnetic field of the write head falls between $H_\alpha$ and $H_\beta$ in FIG. 7. In this state, the inversion of the magnetization from the first through third magnetic layers 23 through 27 occurs while always maintaining the antiparallel magnetizations of the adjacent magnetic layers 23 and 25 and the antiparallel magnetizations of the adjacent magnetic layers 25 and 27.

Furthermore, it is desirable that the coercivities Hc1 and Hc3 of the first and third magnetic layers 23 and 27 are set in a range to satisfy the following relationship.

$$|Hc1-Hc3|/(Hc1+Hc3)/2<0.3$$

When the coercivities Hc1 and Hc3 exceed the above range, a coercivity squareness ratio which is defined by a middle portion of the hysteresis loop in FIG. 7 becomes less than 0.65, and a sufficiently large recording resolution cannot be obtained.

Moreover, it is desirable that a saturation magnetization and thickness product Ms1×t1 of the first magnetic layer 23 and a saturation magnetization and thickness product Ms3×t3 of the third magnetic layer 27 are set in a range to satisfy the following relationship.

$$|Ms1 \times t1 - Ms3 \times t3|/(Ms1 \times t1 + Ms3 \times t3)/2 < 0.3$$

When the saturation magnetizations Ms1 and Ms3 satisfy the above range, the coercivity squareness ratio which is defined by the middle portion of the hysteresis loop in FIG. 7 can be maintained greater than or equal to 0.60. Since the first and third magnetic layers 23 and 27 contribute to the head output approximately to the same extent, it is important to satisfy this relationship from the point of view of improving recording resolution.

In addition, it is preferable that relationships t2<t1 and t2<t3 stand. If an exchange magnetic field strength received by the second magnetic layer 25 is denoted by Hex2, it is preferable that relationships |Hex2|>Hc1 and |Hex2|>Hc3 stand and/or relationships |Hex2−Hc2|>Hc1 and |Hex2−Hc2|>Hc3 stand.

If it is assumed that the dynamic coercivity indicates the coercivity that is observed when the A.C. magnetic field is applied with respect to the magnetic recording medium at the write frequency of the head which writes information on the magnetic recording medium, it is preferable that the following relationships stand, where $Hc1'$ denotes the dynamic coercivity of the first magnetic layer 23, $Hc3'$ denotes the dynamic coercivity of the third magnetic layer 27, and Hex2 denotes the exchange magnetic field intensity received by the second magnetic layer 25.

$$|Hex2|>Hc1' \text{ and } |Hex2|>Hc3'$$

and/or $$|Hex2-Hc2'|>Hc1' \text{ and } |Hex2-Hc2'|>Hc3'$$

Therefore, according to this embodiment of the magnetic recording medium, the effective thickness of the recording layer of the magnetic recording medium when viewed from the read head is a result of mutual cancellation caused by the magnetization direction of the second magnetic layer 25 which is antiparallel to the magnetization directions of the first and third magnetic layers 23 and 27. For this reason, it is possible to prevent the recording state of the magnetic recording medium from instantaneously assuming a parallel coupled state, and the NLTS and the resolution can be improved.

Moreover, since the first and third magnetic layers 23 and 27 are separated in a vertical direction perpendicular to the substrate surface, the magnetic grains per unit area become doubled, and in principle, it is possible to reduce the media noise to $1/\sqrt{2}$. In terms of the SNR, this media noise reduction corresponds to an improvement of approximately 3 dB.

Figure 1:
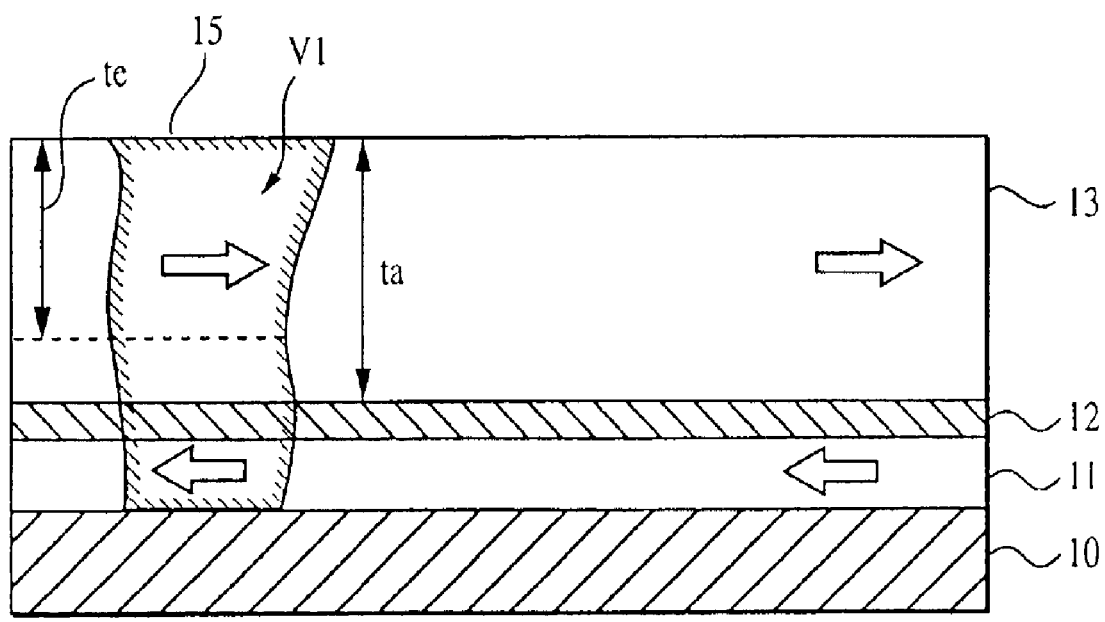
FIG. 1 is a cross sectional view showing a magnetic recording medium employing a proposed technique.
Figure 2:
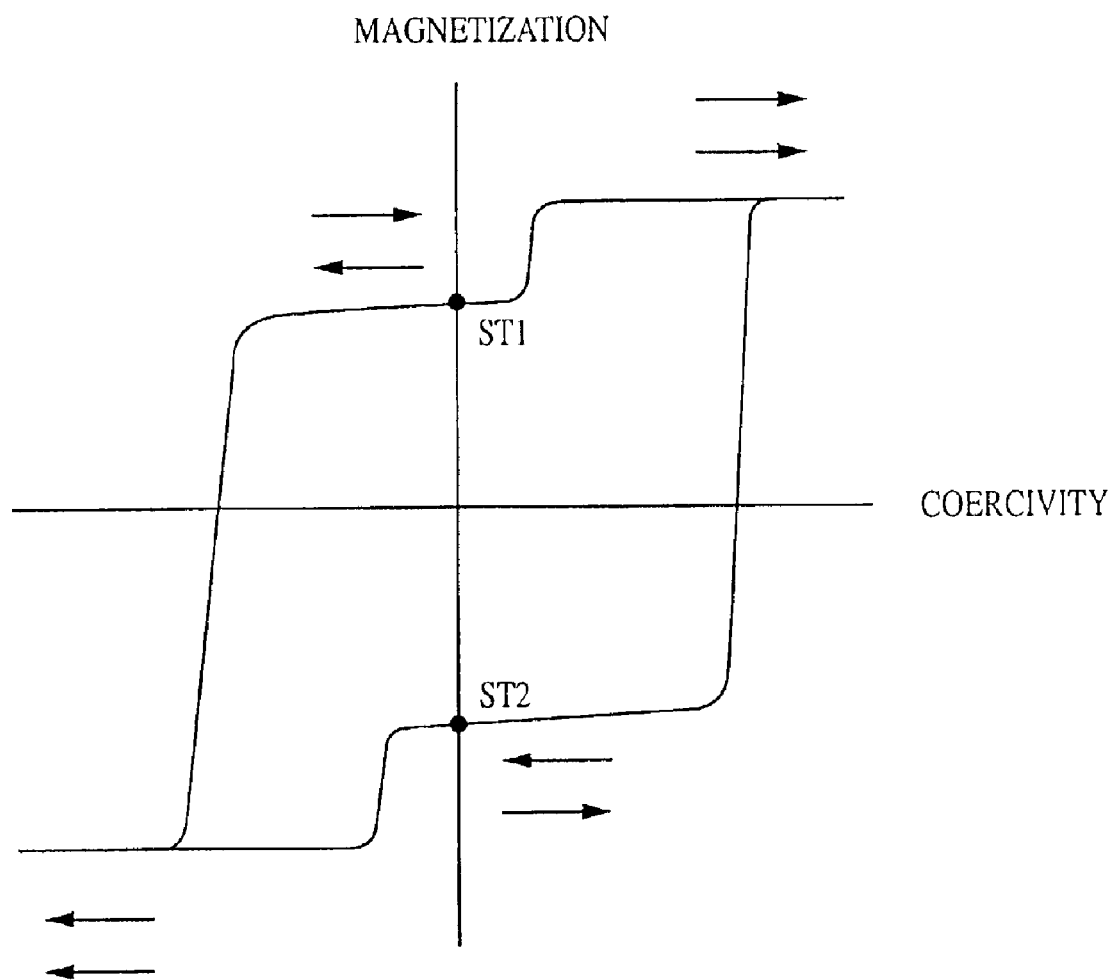
FIG. 2 is a diagram showing a hysteresis loop for the magnetic recording medium shown in FIG. 1.
Figure 3A:
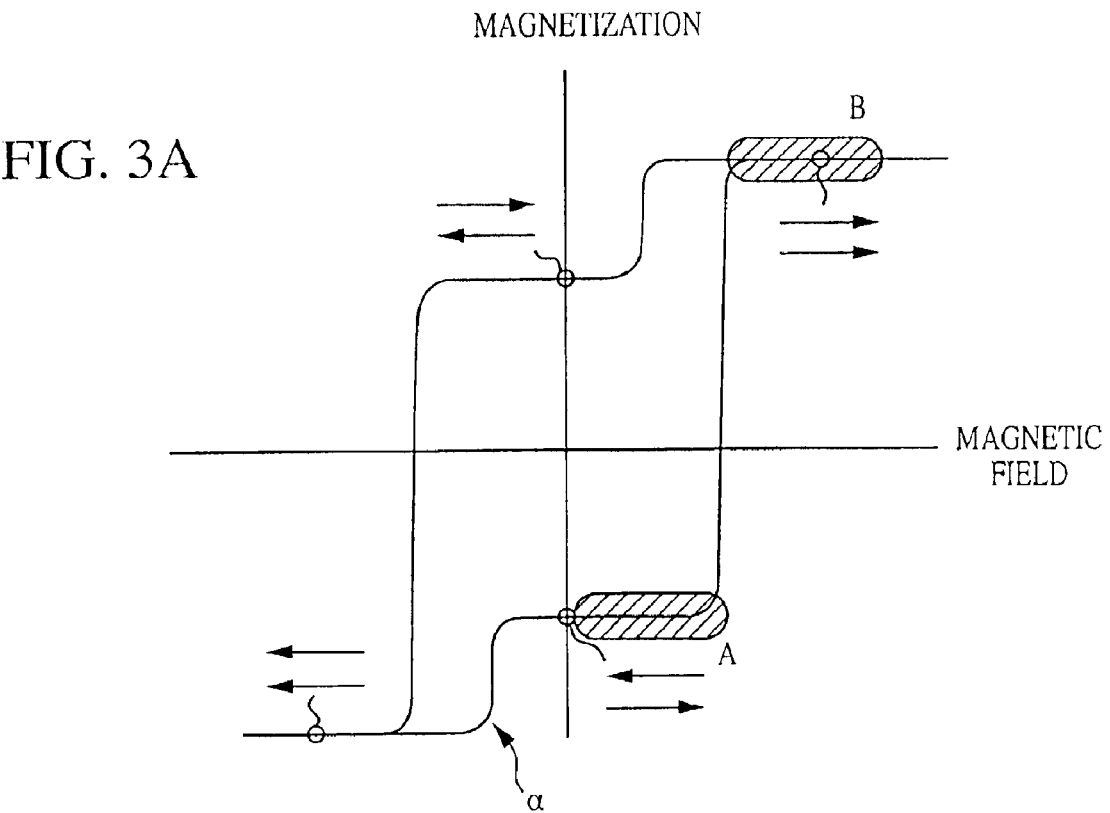
FIGS. 3A and 3B are diagrams for generally explaining situations where bits are recorded on the magnetic recording medium shown in FIG. 1.
Figure 3B:
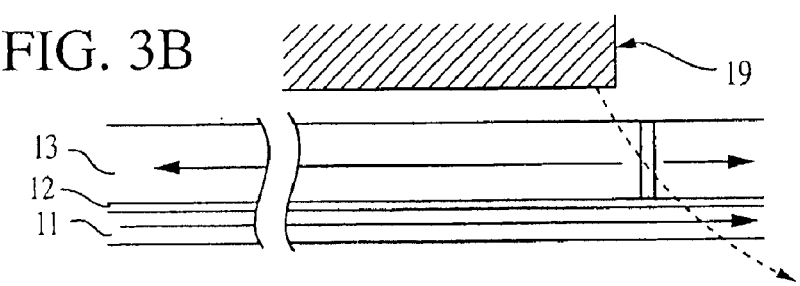
Figure 4A:
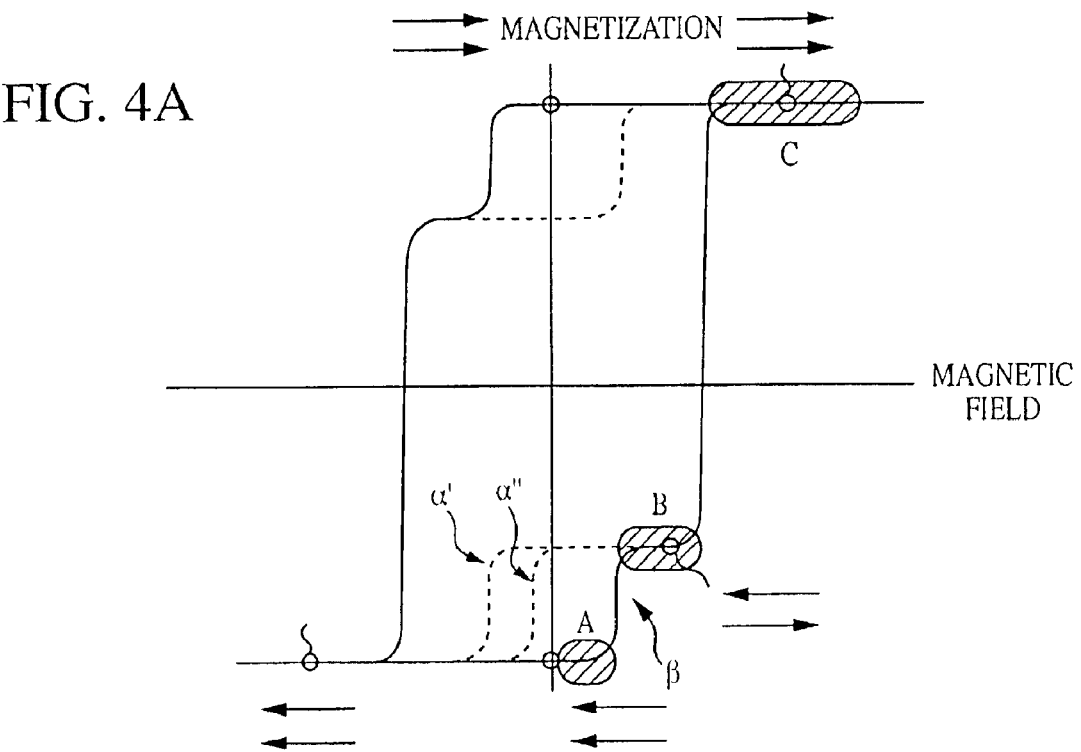
FIGS. 4A and 4B are diagrams for generally explaining situations where bits are recorded on the magnetic recording medium shown in FIG. 1.
Figure 4B:
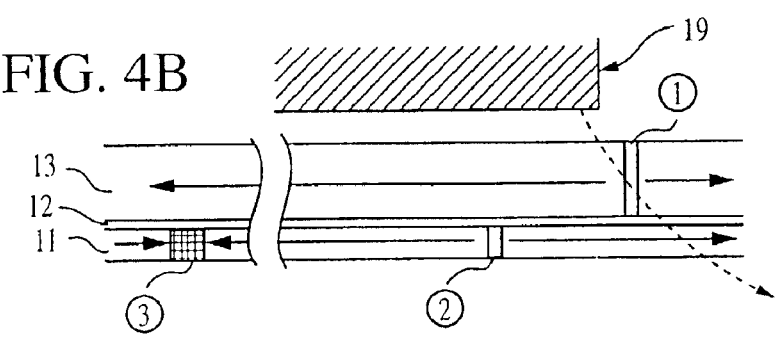

In the case of the magnetic recording medium having the hysteresis loop shown in FIG. 2, it is impossible to use a material having a sufficiently large anisotropy for the magnetic layer 11 shown in FIG. 1, in order to avoid the state described above in conjunction with FIGS. 4A and 4B. In the magnetic recording medium shown in FIG. 1, the magnetic layer 11 is thin, and it is difficult to evaluate the magnetic anisotropy of the magnetic layer 11 by itself. However, it may be inferred that the anisotropic energy of the magnetic layer 11 which is approximately 5 nm is reduced to one-half that of the magnetic layer 11 which is made of the same material and is approximately 10 nm.

On the other hand, in this embodiment of the magnetic recording medium having the hysteresis loop shown in FIG. 7, the first and third magnetic layers 23 and 27 may both have a relatively large thickness of approximately 10 nm, for example. Consequently, the first magnetic layer 23 can generate a sufficiently large magnetic anisotropic energy, to thereby effectively improve the thermal stability.

In addition, a sum of the exchange coupling magnetic fields from the first and third magnetic layers 23 and 27 act on the second magnetic layer 25, and an exchange coupling magnetic field Hex shown in FIG. 7 is generated. Because the second magnetic layer 25 forms an antiferromagnetic coupling layer, the second magnetic layer 25 is thin compared to the first and third magnetic layers 23 and 27, and an alloy having a high Co-concentration is used for the second magnetic layer 25 in order to increase the exchange coupling magnetic field. This exchange coupling magnetic field can easily be made greater than or equal to 5000 Oe. When the Co-concentration of the second magnetic layer 25 is increased, the saturation magnetization Ms2 of the second magnetic layer 25 increases, and thus, the second magnetic layer 25 needs to be thin to a certain extent such that the magnetizations of the first and third magnetic layers 23 and 27 are not greatly cancelled. It is preferable to set the thickness of the second magnetic layer 25 in a range of approximately 1 nm to 3 nm. Since the second magnetic layer 25 is sufficiently thin and the exchange coupling magnetic field Hex mainly determines a transition width penetrating the second magnetic layer 25, the transition width will not increase and a high-density recording can be realized even if a material such as pure Co is used for the second magnetic layer 25.

Next, a description will be given of the performance of this embodiment of the magnetic recording medium. It is assumed that the substrate 21 is made of glass, and the underlayer 22 has a multi-layer structure which is made Up of an amorphous seed layer and an underlayer which is formed on the seed layer and is made of a CrMo alloy or the like having a BCC structure and a (002) crystal face oriented parallel to the substrate surface. In addition, it is assumed that the first and third magnetic layers 23 and 27 are made of CoCrPtB having the same composition, the second magnetic layer 25 is made of CoCr, and the first and second nonmagnetic layers 24 and 26 are made of Ru. It is also assumed that the thickness of the amorphous seed layer forming the multi-layer structure of the underlayer 22 is 25 nm, the thickness of the CrMo alloy underlayer of the multi-layer structure of the underlayer 22 is 10 nm, and the thicknesses of the first and second nonmagnetic layers 24 and 26 respectively are 0.8 nm. Furthermore, it is assumed that the thicknesses of the first, second and third magnetic layers 23, 25 and 27 respectively are 12 nm, 2 nm and 12 nm, and that the thickness of the protection layer 28 is 5 nm. It was confirmed that this magnetic recording medium has a good in-plane magnetic orientation.

A hysteresis loop observed for this magnetic recording medium was similar to that shown in FIG. 6, and the coercivity Hc was approximately 3900 Oe and the exchange coupling magnetic field Hsw was approximately 8000 Oe. In addition, the residual area magnetization of this magnetic recording medium was approximately 0.32 Memu/cm$^2$. This magnetic recording medium will be referred to as the magnetic recording medium MED1.

For comparison purposes, a magnetic recording medium MED2 having the same residual area magnetization and coercivity He as those of the magnetic recording medium MED1 was prepared, by omitting the first and second nonmagnetic layers 24 and 26 and the second magnetic layer 25. The residual coercivity was adjusted by the thicknesses of the CoCrPtB first and third magnetic layers 23 and 27. The coercivity He was adjusted by the thickness of the CoCrMo underlayer forming the multi-layer structure of the underlayer 22 and the heating conditions after forming the amorphous seed layer forming the multi-layer structure of the underlayer 22.

The following Table shows the characteristics of the magnetic recording media MED1 and MED2. In the Table, SNR indicates the media SNR, and the resolution indicates the isolated wave ratio at 320 KFCI.

TABLE

| Medium | SNR | NLTS | Resolution | KuV/kT |
|---|---|---|---|---|
| MED1 | 23 dB | 12% | 52% | 70 |
| MED2 | 21 dB | 11% | 49% | 50 |

As may be seen from the Table, it was confirmed that the NLTS does not deteriorate for the magnetic recording medium MED1. In addition, it was also confirmed that the resolution is improved for the magnetic recording medium MED1. It may be regarded that the resolution of the magnetic recording medium MED1 is improved because a signal attenuation more easily occurs due to thermal instability in the high recording density region for the magnetic recording medium MED2. The thermal stability factor KuV/kT which is obtained by measuring the dynamic coercivity Hc' is 70 for the magnetic recording medium MED1 which is a sufficiently high value for realizing thermal stability, where Ku denotes a magnetic anisotropy constant, V denotes an average magnetic grain volume, k denotes a Boltzmann constant, and T denotes the temperature. On the other hand, the thermal stability factor KuV/kT for the magnetic recording medium MED2 is 50 which is low for practical use. It was also confirmed that the media noise for the magnetic recording medium MED1 is reduced by approximately 20% compared to that of the magnetic recording medium MED2, and that the media SNR is accordingly improved by approximately 2 dB for the magnetic recording medium MED1 compared to the magnetic recording medium MED2.

Figure 8:
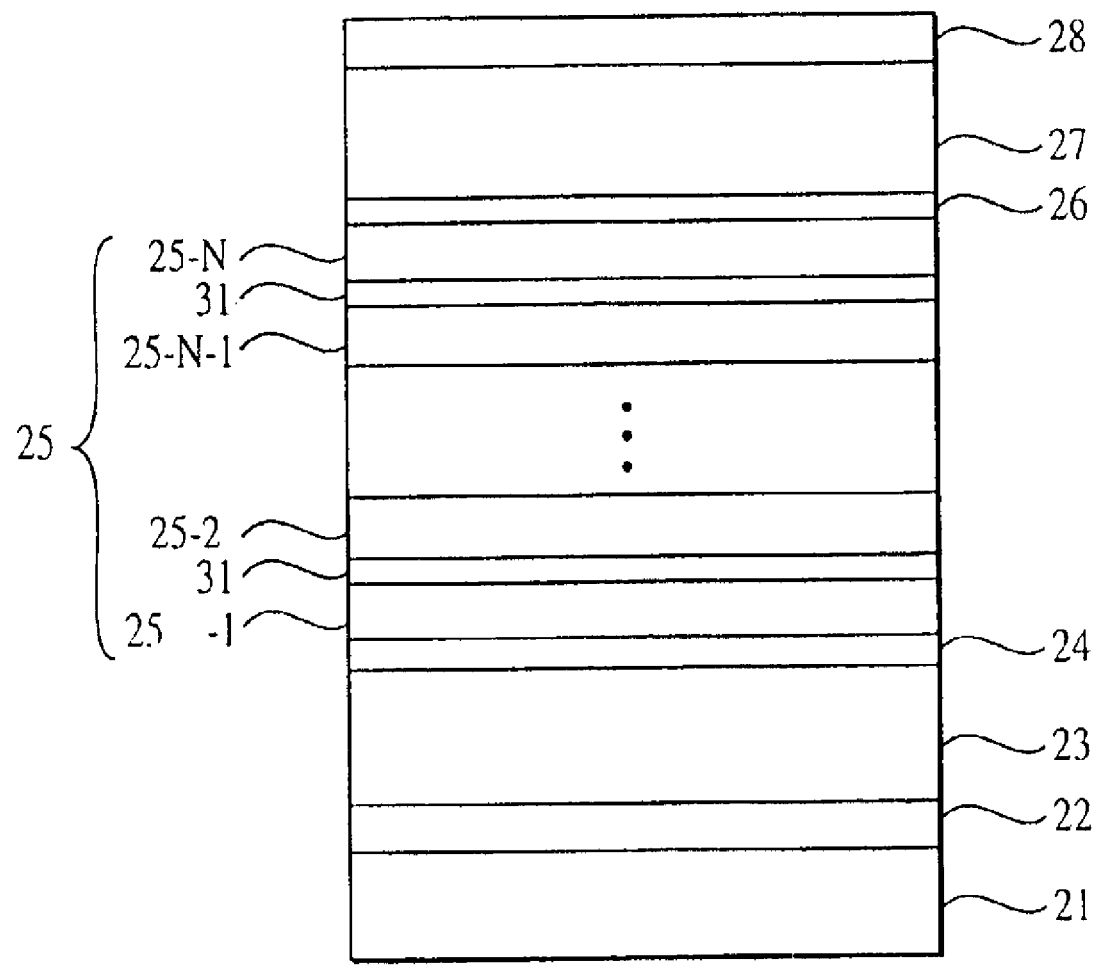
FIG. 8 is a cross sectional view showing part of a second embodiment of the magnetic recording medium according to the present invention.

Next, a description will be given of a second embodiment of the magnetic recording medium according to the present invention, by referring to FIG. 8. FIG. 8 is a cross sectional view showing part of this second embodiment of the magnetic recording medium. In FIG. 8, those parts which are the same as those corresponding parts in FIG. 5 are designated by the same reference numerals, and a description thereof will be omitted.

As shown in FIG. 8, the second magnetic layer 25 of this embodiment is made up of a plurality of magnetic layers 25-1 through 25-N, where N is an odd number greater than or equal to three, where each two adjacent magnetic layers of the second magnetic layer 25 are separated by a nonmagnetic layer 31. The magnetic layers 25-1 through 25-N which form the second magnetic layer 25 are antiferromagnetically coupled, and the magnetization directions of the magnetic layers 25-1 through 25-N alternate in opposite directions so that two adjacent magnetic layers of the second magnetic layer 25 have antiparallel magnetizations. According to this embodiment, it is possible to obtain effects which are similar to those obtainable by the first embodiment described above.

Figure 9:
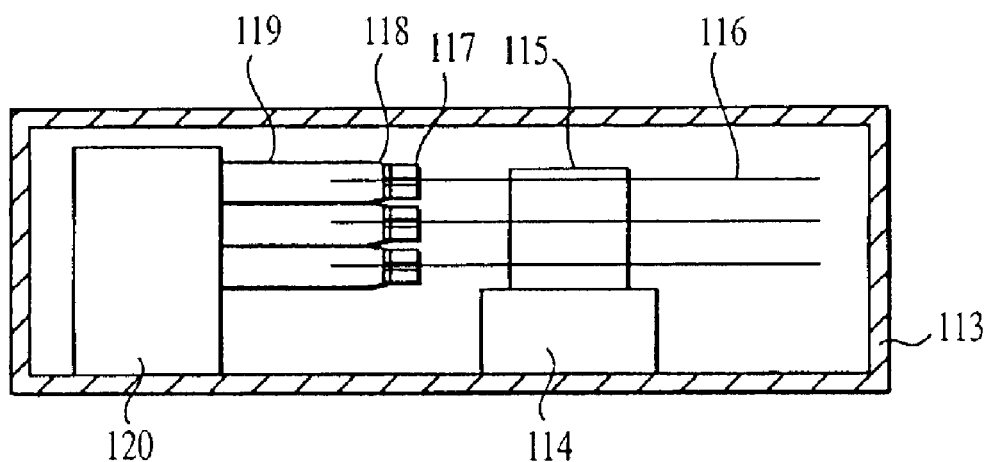
FIG. 9 is a cross sectional view showing part of an embodiment of a magnetic storage apparatus according to the present invention.

Next, a description will be given of an embodiment of the magnetic storage apparatus according to the present invention, by referring to FIGS. 9 and 10. FIG. 9 is a cross sectional view showing an important part of this embodiment of the magnetic storage apparatus, and FIG. 10 is a plan view showing part of this embodiment of the magnetic storage apparatus.

Figure 10:
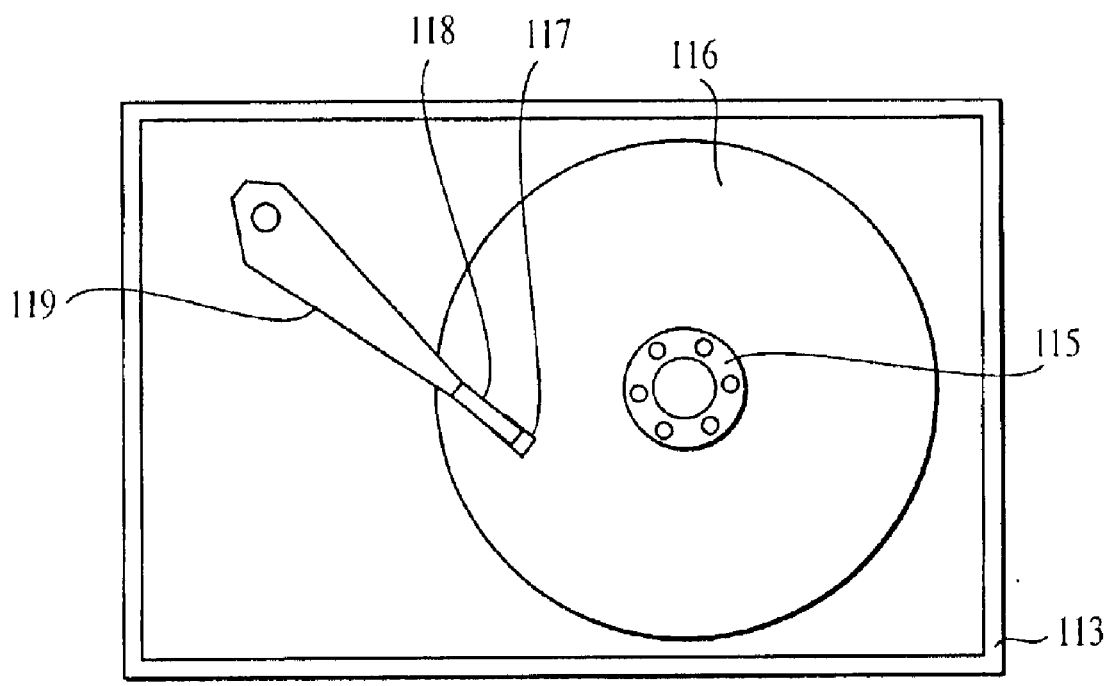
FIG. 10 is a plan view showing part of the magnetic storage apparatus of FIG. 9.

As shown in FIGS. 9 and 10, the magnetic storage apparatus generally includes a housing 113. A motor 114, a hub 115, a plurality of magnetic recording media 116, a plurality of write/read heads 117, a plurality of suspensions 118, a plurality of arms 119, and an actuator unit 120 are provided within the housing 113. The magnetic recording media 116 are mounted on the hub 115 which is rotated by the motor 114. Each write/read head 117 is made up of a write head such as an inductive head, and a read head such as an MR or GMR head. Each write/read head 117 is mounted on a tip end of the corresponding arm 119 via the corresponding suspension 118. Each arm 119 is driven by the actuator unit 120. The basic structure of this magnetic storage apparatus is known, and a detailed description thereof will be omitted in this specification.

This embodiment of the magnetic storage apparatus is characterized by the magnetic recording media 116. Each magnetic recording medium 116 has the structure of the first embodiment of the magnetic recording medium shown in FIG. 5 or the structure of the second embodiment of the magnetic recording medium shown in FIG. 8. Of course, the number of magnetic recording media 116 is not limited to three, and it is possible to provide one, two, or more than three magnetic recording media 116.

The basic structure of the magnetic storage apparatus is not limited to that shown in FIGS. 9 and 10. In addition, the magnetic recording medium used by the magnetic storage apparatus according to the present invention is not limited to a magnetic disk, and various kinds of magnetic recording media may be used, including magnetic tapes and magnetic cards.

Further, the present invention is not limited to these embodiments, but various variations and modifications may be made without departing form the scope of the present invention.

What is claimed is:

1. A magnetic recording medium comprising:
   one or a plurality of underlayers;
   a first magnetic layer having a saturation magnetization $Ms1$ and a thickness $t1$ disposed above said one or plurality of underlayers;
   a first nonmagnetic layer provided on said first magnetic layer;
   a second magnetic layer, provided on said first nonmagnetic layer, having a saturation magnetization $Ms2$ and a thickness $t2$;
   a second nonmagnetic layer provided on said second magnetic layer; and
   a third magnetic layer, provided on said second nonmagnetic layer, having a saturation magnetization $Ms3$ and a thickness $t3$,
   said first, second and third magnetic layers having magnetization directions which are alternately antiparallel in a state where no external magnetic field is applied on the magnetic recording medium,
   wherein $Ms2 \times t2 < (Ms1 \times t1 + Ms3 \times t3)$; and wherein relationships $t2 < t1$ and $t2 < t3$ stand, wherein $t1$, $t2$ and $t3$ respectively denote thicknesses of said first, second and third magnetic layers.

2. The magnetic recording medium as claimed in claim 1, wherein:
   said first, second and third magnetic layers are respectively made of a material selected from a group consisting of Co, Ni, Fe, Ni alloys, Fe alloys and Co alloys, and
   said Co alloys include CoCrTa, CoCrPt and CoCrPt-M, where M=B, Mo, Nb, Ta, W, Cu, C or alloys thereof.

3. The magnetic recording medium as claimed in claim 1, wherein said first and second nonmagnetic layers are respectively made of a material selected from a group consisting of Ru, Rh, Ir, Ru alloys, Rh alloys and Ir alloys.

4. The magnetic recording medium as claimed in claim 1, wherein said first and second nonmagnetic layers respectively have a thickness of 0.4 nm to 2.0 nm.

5. The magnetic recording medium as claimed in claim 1, wherein:
   said second magnetic layer is made up of N magnetic layers, where N is an odd number greater than or equal to three,
   each two adjacent magnetic layers of said second magnetic layer are separated by a nonmagnetic layer, and
   the magnetic layers which form said second magnetic layer are antiferromagnetically coupled so that magnetization directions thereof are alternately in opposite directions so that two adjacent magnetic layers of said second magnetic layer have antiparallel magnetizations.

6. The magnetic recording medium as claimed in claim 1, wherein $|Hex2|>Hc1$ and $|Hex2|>Hc3$, where Hc1 denotes a coercivity of said first magnetic layer, Hc3 denotes a coercivity of said third magnetic layer, and Hex2 denotes an exchange magnetic field intensity received by said second magnetic layer.

7. The magnetic recording medium as claimed in claim 1, wherein $|Hex2-Hc2|>Hc1$ and $|Hex2-Hc2|>Hc3$, where Hc1 denotes a coercivity of said first magnetic layer, Hc2 denotes a coercivity of said second magnetic layer, Hc3 denotes a coercivity of said third magnetic layer, and Hex2 denotes an exchange magnetic field intensity received by said second magnetic layer.

8. The magnetic recording medium as claimed in claim 1, wherein $|Hex2|>Hc1'$ and $|Hex2|>Hc3'$, where Hc1' denote a dynamic coercivity of said first magnetic layer, Hc3' denotes a dynamic coercivity of said third magnetic layer, and Hex2 denotes an exchange magnetic field strength received by said second magnetic layer.

9. The magnetic recording medium as claimed in claim 1, wherein $|Hex2-Hc2'|>Hc1'$ and $|Hex2-Hc2'|>Hc3'$, where Hc1' denote a dynamic coercivity of said first magnetic layer, Hc2' denotes a dynamic coercivity of said second magnetic layer, Hc3' denotes a dynamic coercivity of said third magnetic layer, and Hex2 denotes an exchange magnetic field strength received by said second magnetic layer.

10. The magnetic recording medium as claimed in claim 1, further comprising:
a substrate provided under said first magnetic layer and under said one or a plurality of underlayer,
said first and third magnetic layers having axes of easy magnetization oriented in-plane which is parallel to said substrate.

11. The magnetic recording medium as claimed in claim 10, wherein:
said one or a plurality of underlayers are disposed between said substrate and said first magnetic layer.

12. A magnetic storage apparatus comprising:
one or a plurality of magnetic recording media; and
recording and/or reproducing means for recording information to and/or reproducing information from said one or plurality of magnetic recording media,
each magnetic recording medium comprising:
one or a plurality of underlayers;
a first magnetic layer having a saturation magnetization Ms1 and a thickness t1 disposed above said one or a plurality of underlayers;
a first nonmagnetic layer provided on said first magnetic layer;
a second magnetic layer, provided on said first nonmagnetic layer, having a saturation magnetization Ms2 and a thickness t2;
a second nonmagnetic layer provided on said second magnetic layer; and
a third magnetic layer, provided on said second nonmagnetic layer, having a saturation magnetization Ms3 and a thickness t3,
said first, second and third magnetic layers having magnetization directions which are alternately antiparallel in a state where no external magnetic field is applied on the magnetic recording medium,
wherein $Ms2 \times t2 < (Ms1 \times t1 + Ms3 \times t3)$; and wherein relationships $t2<t1$ and t1, t2 and t3 respectively denote thicknesses of said first, second and third magnetic layers.

* * * * *

UNITED STATES PATENT AND TRADEMARK OFFICE
CERTIFICATE OF CORRECTION

PATENT NO.    : 6,881,496 B2
DATED         : April 19, 2005
INVENTOR(S)   : Iwao Okamoto It is certified that error appears in the above-identified patent and that said Letters Patent is hereby corrected as shown below:

Column 16,
Line 35, after "t2<t1 and" insert -- t2<t3 stand, wherein --.

Signed and Sealed this

Ninth Day of August, 2005

JON W. DUDAS
*Director of the United States Patent and Trademark Office*